United States Patent Office

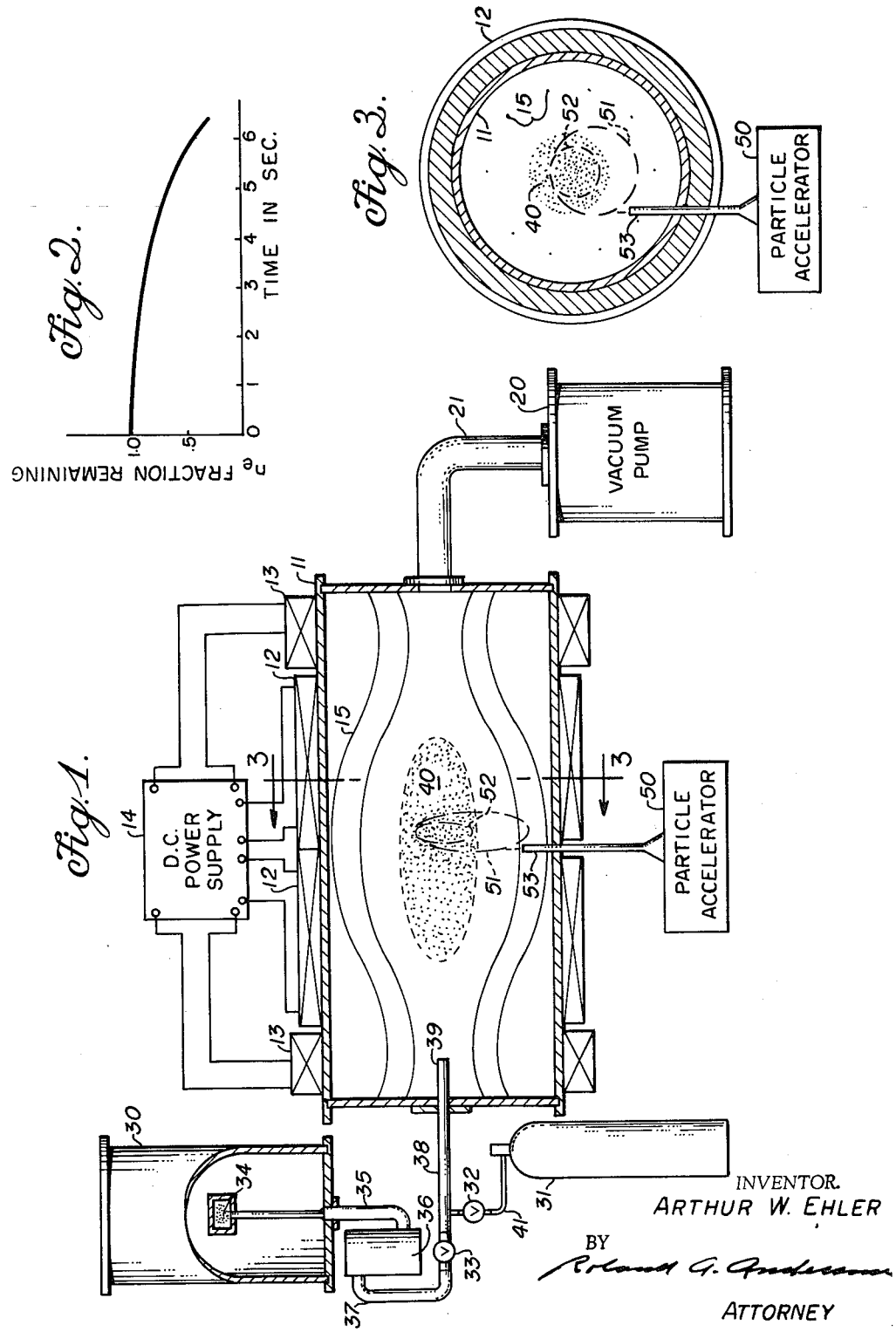

3,218,235
Patented Nov. 16, 1965

3,218,235
METHOD AND APPARATUS FOR PRODUCING A MAGNETICALLY CONFINED HOT DENSE PLASMA
Arthur W. Ehler, Los Angeles, Calif., assignor to the United States of America as represented by the United States Atomic Energy Commission
Filed Dec. 9, 1963, Ser. No. 329,327
16 Claims. (Cl. 176—5)

The present invention relates to the production of confined high temperature gases or plasmas including those useful in providing controlled continuous thermonuclear reactions and, more particularly to a method of utilizing a novel injection operation and apparatus for producing a confined high-temperature gas or plasma useful, for example, in a controlled nuclear fusion process.

Systems incorporating high temperature gases or plasmas, that is, electrically neutral quantities of ions and electrons, are of utility in various diverse fields and technologies such as aerospace propulsion, controlled thermonuclear reactions, and magnetohydrodynamics to name a few. It is generally accepted that such gases and plasmas must be confined by other than solid material walls, namely, by magnetic fields of special configurations providing charged particle containment zones. Various methods have heretofore been devised for producing such confined gases and plasmas. Such methods, either alone or in combination generally utilize various and sundry ion sources whose emitted particles are manipulated in a variety of ways by magnetic fields or interaction of charged particles and the like to effect injection, ionization, particle dissociation, trapping, heating or any other phenomena to produce a high temperature gas or plasma.

Present method of particle containment utilize a magnetic confining field sometimes referred to as a magnetic "bottle." For example, a magnetic mirror machine wherein the ions are trapped after being injected into the magnetic field either internally or externally by a variety of operations or manipulations as noted above. Injection internally, that is, placing the ion generating means inside the "bottle" defined by the static magnetic field, leads to the problem of the ion, upon its first orbit in the magnetic field, returning to collide with the muzzle of the ion injecting means, thus dissipating the energy of the ion. Injection externally, that is placing the ion source outside the magnetic defined "bottle" leads to the problem of providing the correct velocity vector components to the ion to cause it to be trapped in the "bottle" rather than be repelled, transmitted or accelerated through the magnetic field. Injection, therefore, involves a variety of other problems dependent upon individual system characteristics of which there may be an infinite variety. Certain plasma devices and systems utilize dissociation and/or heating of neutral gas molecules, molecular ions and energetic neutral particles injected internally of the magnetic confinement field to provide a confined high temperature plasma. The efficiency of such devices and systems depends in large measure upon the efficacy of the dissociation process employed, especially during initial phases of the injection operation.

The present invention avoids difficulties associated with various prior devices in that $He^6$ or other isotope decay source of high energy electrons is introduced into a weak magnetically confining field wherein the $He^6$ decays, in situ, isotropically emitting relativistic electrons which are trapped by the weak magnetically confining field to form a plasma. The magnetically confining field may be of a variety of configurations such as that used by the Pyrotron or "mirror" type of machine described in copending application No. 443,447 filed July 14, 1954 now Patent 3,170,841 and U.S. Patent No. 3,071,525, inter alia.

After purging the $He^4$ (which occurs and is carried with the $He^6$) or other neutral atoms which hydrogen or other gaseous elements, energetic molecular ions of $H_2^+$, $D_2^+$, $T_2^+$ or $HD^+$ or other fuel particles or elements are injected into the magnetic confining field simultaneously with, or shortly after compressing the plasma by increasing the magnetic field intensity. The protons in the system, having been dissociated by the energetic electrons during and after purging and immediately prior to compression, act now as efficient means for dissociating the molecular ions so that the injected ions are dissociated, trapped and confined in the magnetic field and in turn act as efficient dissociating means for further dissociating later injected molecular ions. Thus results a magnetically confined plasma of high temperature, density and purity and consisting of electrons and almost totally dissociated and ionized atoms.

Accordingly, it is an object of the present invention to provide methods and apparatus for producing high temperature gases and/or plasmas.

Another object of this invention is to produce a magnetically confined plasma containing only electrons and dissociated ionized atoms.

It is a further object of this invention to increase the efficiency in dissociating and ionizing atoms, molecules, and molecular ions injected into a magnetic confinement field.

Another object of this invention is to utilize high energy relativistic electrons produced by the decay of radioisotopes to dissociate and heat atomic and molecular charged and uncharged particles to provide ions to be confined in a magnetic confinement field.

Still another object of this invention is to employ high energy or relativistic electrons emitted by $He^6$ or other radioisotope gas introduced into a magnetic confinement field to dissociate and/or ionize atomic, molecular and/or molecular ion particles to produce a plasma in such a confinement field.

A further object of the invention is to employ high energy or relativistic electrons emitted by $He^6$ or other radioisotope gas introduced into a magnetic confinement field to dissociate and/or ionize atomic, molecular and/or molecular ion particles to produce a confined quantity of electrons and ions trapped in a low intensity level of said magnetic field and thereafter to replace and/or substitute other ions and gases in said field and then to compress the trapped quantity of particles by intensification of said magnetic field simultaneously with or shortly before injecting high energy particles into the plasma.

The invention, together with further objects and advantages thereof, will be better understood by reference to the following description and accompanying drawing, of which FIGURE 1 is a composite, longitudinal section and block diagram of the major parts of the invention;

FIGURE 2 is a graphic illustration of the rate of loss of the electrons from the compressed plasma as a function of time;

FIGURE 3 is a transverse section through the magnetic mirror containment vessel showing a method of injecting molecular ions in a plasma.

In brief, to practice this invention, there is employed apparatus means for providing a high temperature gas or plasma generally similar to the aforementioned controlled fusion or controlled thermonuclear reactor devices. Characteristically such devices employ vacuum vessels in which are provided axially symmetric and other magnetic field distributions of a linear, toroidal figure 8, or other configuration defining a magnetic confinement or containmentzone for charged particles. A general type of such a reactor which is particularly adaptable for practicing the present invention are those incorporating an axially symmetric field somewhat elongated to provide a central linear region of relatively low magnetic flux density and an intensified or nodal terminal field region of greater magnetic flux density termed magnetic mirrors. The containment zone is defined in the aforesaid linear field region between said mirrors. Among the devices employing the foregoing field configuration are those terms Pyrotrons, Astron, DCX, OGRA, ALICE as well as those of the application and patent cited above. Such devices include a variety of means for injecting beams of atomic ions, molecular ions, energetic neutral atoms and molecules, and gaseous molecules into the magnetic field for the purpose of forming a plasma of the injected materials. The devices also include means for trapping the injected particles by sundry manipulations appropriate to the nature and state of the injected particles. Charged particles are generally trapped by a manipulation of magnetic fields, while uncharged particles are dissociated and/or ionized within the plasma containment zone by various means such as collision with electrons or other charged and/or neutral particles in the containment zone, irradiation with X-rays, ultraviolet, etc. Molecular ions, that is, molecules which are partially ionized but not dissociated into ionized atoms, may be trapped by either of the foregoing or combination thereof eventuating in the formation of ionic particles and electrons.

In accordance with the present invention, there is employed a source of selected radioisotopes such as $He^6$ coupled to said vacuum vessel in order to introduce the $He^6$ therein. Evacuation means such as the usual vacuum pumping system of a fusion reactor is employed to cause the flow of the aforesaid radioactive gas and/or other selected gases through the plasma containment zone. It is preferred to utilize a controlled fusion reactor or other containment plasma device, which provides a magnetic containment zone of low magnetic field intensity and of a relatively large volume, into which said radioisotope gas may be introduced and in which electrons and other particles emitted or produced are initially accumulated. A device preferred for practicing the present invention also includes magnetic field intensifying and/or other magnetic field manipulation means whereby the magnetic field containment zone volume may be reduced so as to increase the electron and other particle densities and for the purposes set forth more fully hereinafter.

More particularly, with reference to FIGURE 1 of the drawing, an apparatus embodiment of the invention is illustrated as comprising a closed cylindrical containment vessel 11 having coaxially placed solenoid coils 12 and 13 energized by a variable magnetic current power supply 14 to form a magnetic field defined by magnetic flux lines 15. Centrally disposed solenoid coils 12 are elongated and are provided with an essentially uniform ampere turns distribution which provides a central linear region of minimum uniform magnetic intensity of flux lines 15. Solenoid coils 13 disposed adjacent the ends of coils 12 are provided with an increased ampere turns distribution providing intensified nodal terminal field regions of increased magnetic flux density defined by magnetic flux lines 15, said intensified field regions converging to magnetic mirror or reflector fields, in the parlance of the art, and said reflector fields bounding a charged particle containment zone in the central linear field region of said magnetic field. Said power supply 14 is made variable in order that the current may be regulated to a low level yielding a relatively low intensity field in said vessel in order that an electron cloud or plasma disposed therein may initially occupy relatively large volume. Subsequently the current is increased to intensify the field, thereby effectively compressing said plasma to occupy a smaller volume. A high vacuum pump 20 or equivalent means is arranged in communication with one end of the vessel 11 as by conduit 21 to permit evacuation of gases therein.

As a prime feature of the invention, a source of $He^6$ or other radioisotope gas capable of emitting energetic beta rays, preferably at a rate equivalent to a short half life, i.e., less than a few minutes and more preferably of a few seconds, is coupled to the second end of said vessel. An appropriate source of $He^6$ may comprise any device capable of irradiating a quantity of beryllium with neutrons, such as, for example, the apparatus and method described in the paper by B. M. Rustad and S. L. Ruby, Physical Review, vol. 97, No. 4, pp. 991–1002 (Feb. 15, 1955), to undergo the reaction $Be^9$ $(n, \alpha)$ $He^6$, such as embodied in nuclear reactor 30 arranged as described above for generating the isotope $He^6$ as well as a supply of purge gas contained in tank 31. Nuclear reactor 30 and gas supply 31 are arranged in communication with vessel 11 through valves 32 and 33 respectively. A molecular ion accelerating means 50 is arranged for injecting molecular ions of $H_2^+$, $D_2^+$, $T_2^+$ or $HD^+$ or other elements into the plasma, therein to be dissociated. Injection of energetic neutral molecules, atoms or neutral gas molecules may likewise be employed.

In order to generate an electron-ion plasma, cylindrical containment vessel 11 is evacuated by vacuum pump 20 through conduit 21. The magnetic current power supply 14 is energized to produce a low level current to form a weak magnetic field defined by magnetic flux lines 15. After sufficiently low vacuum pressure is reached, valve 33 is opened allowing $He^6$ and $He^4$ generated in cavity 34 in the nuclear reactor 30 by virtue of the reaction $Be^9$ $(n, \alpha)$ $He^6$ to successively flow with a hydrocarbon or other vapor as a transport means through conduit 35 into impurity trap 36 where the hydrocarbon or other vapor is removed from the system, through conduit 37, through valve 33, through conduit 38 and finally out of nozzle 39 into the plasma containment zone 40.

As the $He^6$ passes through the plasma containment zone 40, a number of $He^6$ neutral gas atoms decay to $Li^6$ in the magnetic containment field zone with the emission of a relativistic electron having an initial energy level of the order of 3.7 mev. The emitted electron is captured within the magnetic field together with the $Li^6$ formed by decay. The rate at which $He^6$ enters the magnetic field containment zone 40 is adjusted to compensate for losses due to electron collisions with the chamber walls, scattering and losses through the magnetic mirror escape cone, cyclotron radiation, and bremsstrahlung radiation through collision with background gases. After a sufficient number of electrons are captured, valve 33 is closed to stop the flow of $He^6$ and $He^4$ gases. The $Li^6$ formed upon the decay of $He^6$ is lost from the plasma while ions of $He^4$ are formed from collisions with emitted electrons, thus maintaining an electrically neutral plasma during the foregoing operation. The trapped relativistic electrons form an electrostatic field thus confining the $He^4$ ions. The system is then evacuated to a minimum pressure, e.g., $10^{-8}$ mm. Hg or less to remove extraneous gases.

Next, valve 32 is opened permitting hydrogen gas contained in tank 31 of the purge gas supply to flow through conduit 41, valve 32, conduit 38 and out of nozzle 39 into the plasma containment zone 40 purging the $He^4$ ions by charge exchange reaction in which hydrogen ions replace the helium ions. The resulting plasma contains mostly cold protons and a small density of $H_2^+$ ions plus the emitted energetic electrons. The purpose of the purging operation is to minimize the charge exchange losses when high energy $H_2^+$ ions are injected into the plasma in a subsequent step of the process. It will be noted that other gases may be used to purge the $He^4$ ions when different high energy particles are injected so that the resulting plasma then contains ions of the introduced gas, which plasma may be used for sundry utilitarian purposes, for example, spectroscopic analyses of the plasam and its contents.

Next, the plasma is compressed by increasing the current in coils 12 and 13 using the magnetic current power supply 14 simultaneously with, or just prior to the injection of high energy ions of $H_2^+$, $D_2^+$, $T_2^+$ or $HD^+$ or other elements into the plasma containment zone using the particle accelerator 50. The energetic molecular ions injected into the plasma will then be dissociated by the cold protons or other purge gas formed during and remaining from the purging operation. In the case of hydrogen and its isotopes, as the energetic hydrogen isotope ion density increases the cold proton density decreases, thus maintaining an electrically neutral plasma eventually producing a relatively pure hydrogen isotope ion plasma. The phenomenon depended upon at this step of the process is the ability of the energetic protons to be equally efficient as cold protons in the dissociation of the injected $H_2^+$, $D_2^+$, $T_2^+$ or $HD^+$ ions. For ions other than protons, the dissociation process is analogous.

The injection of molecular ions may now continue thus increasing the hot plasma density to a point where either a nuclear fusion reaction takes place where hydrogen isotope ions of an atomic weight greater than one are present (helium may be used in the foregoing in a manner equivalent to tritium), or the plasma is treated or manipulated in some other way for a useful purpose. The above disclosure of the method has been somewhat general in nature; however the following more specific discussion may best illustrate details of the method of operation using one of the many types of aforementioned machines.

Let the following parameters be used for illustrative purposes:

(1) At starting, a weak magnetic field of 500–1000 gauss.

(2) Magnetic mirror containment field effective length $=1000$ cm.

(3) Cylindrical containment vessel diameter$=110$ cm.

(4) Gas flow rate of $He^6$ atoms entering the magnetic mirror containment region, $3\times10^{14}$ atoms/sec. (as obtained from 15 kg. of BeO powder in a neutron flux$\cong2.5\times10^{15}$ n./cm.²/sec. with 1% of the $He^6$ atoms produced decaying within the magnetic mirror containment region).

(5) Rate of $He^4$ atoms entering the magnetic mirror containment region$=3\times10^{16}$ atoms/sec.

The initial vacuum pumping rate is maintained to achieve a $He^4$ density of $6\times10^9$ atoms/cm.³. At this density, the $He^6$ will remain in the magnetic mirror containment zone 40 for approximately 2 sec. The number of electrons emitted during this time can be calculated according to the electron beta-decay rate equation.

$$(1) \qquad \dot{n}_e = \frac{\dot{N}(1-e^{-\lambda t})}{\pi a^2 L}$$

where:

$\dot{n}_e$=beta-decay rate in electrons per cm.³/sec.
$a$=mirror tube radius$=55$ cm.
$L$=Mirror field length$=1000$ cm.
$\dot{N}$=number of $He^6$ atoms entering the area per second$=3\times10^{14}$
$\lambda$=decay constant for $He^6=0.85$ second
$e$=naperian constant$=2.7183$
$\pi$=constant$=3.1416$
$t$=time in seconds$=2.0$ For the parameters noted above, the value of $\dot{n}_e=2.7\times10^7$ electrons per cm.³/sec.

The electron density at equilibrium is obtained by totaling the losses in the system and equating them to electrons entering the system through beta-decay.

As a practical matter and to simplify calculations, there are really only two appreciable sources of loss, namely scattering of $\beta$ decay electrons into the mirror escape cone by neutral atoms and by ions or electrons. Therefore, electron-ion and neutral atom scattering losses respectively equated are $$(2) \qquad \frac{10^{-13}Z^2n_e^2}{2E^{3/2}} + \frac{10^{-13}Z^2n_0n_e}{2E^{3/2}} = -\dot{n}_e$$

where:

$Z$=nuclear charge of the ion ($=2$ for He)
$n_e$=electron density in electron per cm³.
$E$=energy of the electrons scattered in mev.
$n_0$=neutral atom density in atoms per cm.³ ($6\times10^9$/cm.³)
$-\dot{n}_e$=electron loss rate For the parameters assumed and assuming further that there is no energy degradation, the equilibrium electron density will be approximately $10^{10}$ electrons/cm.³. Conservatively, and as a practical matter, the value of $6\times10^9$ electrons per cm.³ will be assumed.

The time required to obtain this equilibrium density is calculated according to the equation $$(3) \qquad \dot{n}'_e = \frac{\dot{N}(1-e^{-\lambda t})}{\pi a^2 L} - \frac{10^{-13}Z^2n_e}{2E^{3/2}}(n_e+n_0)$$

where:

$\dot{n}'_e$=time rate of change of electron density in electrons per cm.³/sec.
$\dot{N}$=number of $He^6$ atoms entering the magnetic mirror containment region in atoms per sec.$=3\times10^{14}$
$\lambda$=decay constant for $He^6=0.85$ second
$t$=time in seconds
$a$=radius of containment vessel$=55$ cm.
$L$=magnetic mirror length$=1000$ cm.
$E$=energy of electron in mev. (assume a mean energy, E, of 1 mev. other than 1.5 mev. because of cyclotron radiation and collision losses)
$Z$=nuclear charge of the ion$=2$ for He
$n_e$=electron density in electrons per cm.³$\cong6\times10^9$ electrons/cm.³.
$n_0$=neutral atom density in atoms per cm.3$=6\times10^9$ atoms/cm.³.

For the above assumed electron density the time for accumulation of these electrons would be, conservatively, 5 minutes. The containment time of relativistic electrons is reasonable taking into account the weak magnetic field, low pressure and low background gas density.

With the above electron density obtained, the valve 33 is closed simultaneously or shortly before the opening of valve 32 permitting hydrogen gas to enter the plasma containment region 40. The flow rate for the hydrogen gas is maintained at $10^4$ liters/sec. for 7 seconds at a containment vessel pressure of about $2\times10^{-7}$ mm.

The number of helium atoms remaining in the system after this time is determined by the equation $$(4) \qquad N_T = N'e - (\dot{N}_1/N')T$$

where:

$N_T$ = number of helium ions remaining after time T
$N'$ = initial number of helium ions in the containment region ($\sim 6 \times 10^{16}$ ions)
$\dot{N}_1$ = hydrogen flow rate in atoms per second ($\sim 6 \times 10^{16}$ atoms/sec.)
$T$ = time in seconds
$e$ = naperian constant = 2.7183

The helium remaining after 7 seconds is only about 0.1% of the initial He$^{4+}$ in the system. The resulting hydrogen plasma will contain mostly cold protons formed by collisions with energetic electrons and a small number of H$_2^+$ ions.

The H$_2^+$ ion density can be computed using the equation (5) $\qquad \dot{N}_2 + \alpha v_1 n_1 2\pi a L = n_2 n_e \sigma_1 c \pi a^2 L$ where:

$\dot{N}_2$ = flow of hydrogen into the system in atoms per sec. $\cong 3 \times 10^{15}$ atoms/sec.
$\alpha$ = the fraction of atomic hydrogen of density $n_1 \approx n_0$ in the system impinging on the walls of the plasma containment vessel and recombining to form H$_Z$ ($\sim 10^{-3}$)
$v_1$ = the velocity of hydrogen atoms impinging on the walls of the plasma containment vessel ($\sim 3 \times 10^5$ cm./sec.)
$n_1$ = atomic hydrogen density in atoms per cm.$^3$ ($\sim 3 \times 10^8$/cm.$^3$)
$\sigma_1$ = dissociation cross section for H$_2^+$ ions in cm.$^2$ by energetic electrons ($\sim 10^{-19}$ cm.$^2$ for 1 mev. electrons)
$n_2$ = density of H$_2^+$ ions in ions per cm.$^3$
$n_e$ = density of electrons in electrons per cm.$^3$ ($\sim 6 \times 10^9$)
$a$ = radius of containment vessel = 55 cm.
$L$ = length of magnetic mirror = 1000 cm.
$\pi$ = constant = 3.1416
$c$ = electron velocity ($\sim 3 \times 10^{10}$ cm./sec.)

Assuming the walls of the plasma containment vessel are aluminum, then only $10^{-3}$ of the hydrogen atoms striking the wall will form molecules. Utilizing the above equation, it can be found that the H$_2^+$ ion plasma density is only about $6 \times 10^7$ ions per cm.$^3$ so that the bulk of the plasma will consist of cold protons and energetic electrons.

The hydrogen plasma is now compressed by increasing the magnetic field by increasing the current from the magnetic current power supply 14 to yield containment zone field strength of 10,000 gauss or more and shortening the mirror containment zone length to 300 cm. This will result in a 40 fold increase in electron density to about $2.5 \times 10^{11}$ electrons per cm.$^3$ while increasing the mean energy of the electrons from 1 to 3 mev. The rate at which electrons are lost from the plasma at this increased pressure by scattering is shown in FIGURE 2 where the ordinate is calibrated in fractions of electrons remaining in the plasma and the abscissa is calibrated in seconds from the time of compression. It can be seen that the plasma will be effective as a dissociating means for only a few seconds after the compression so that the injection of energetic H$_2^+$ ions should begin simultaneously with or very shortly after the compression of the plasma.

Therefore, when compression begins, H$_2^+$ ions are now injected into the plasma containment region 40 by molecular ion particle accelerator 50 at a current of 0.4 a. and an energy level of 600 kev. with a trajectory length of 30 meters within the region 40. The H$_2^+$ diassociation cross section for cold protons and energetic electrons is $6 \times 10^{-17}$ cm.$^2$ and $10^{-19}$ cm.$^2$ respectively. Therefore, since the cold protons have the larger dissociation cross section they will be the primary means of dissociating the incoming molecular ions.

The probability of dissociation is determined by the equation (6) $\qquad P = (n_e \sigma_1 c + n'_p \sigma_2 v_2) t_2$ where:

$P$ = probability of dissociation
$n_e$ = the electron density in electrons per cm.$^3$
$\sigma_1$ = dissociation cross section in cm.$^2$ for H$_2^+$ ions by energetic electrons, $10^{-19}$ cm.$^2$
$c$ = electron velocity ($\sim 3 \times 10^{10}$ cm./sec.)
$n'_p$ = density of cold protons $\approx$ electron density $n_e$
$\sigma_2$ = dissociation cross section in cm.$^2$ for H$_2^+$ ions by protons, $6 \times 10^{-17}$ cm.$^2$
$v_2$ = velocity of the injected H$_2^+$ ions in cm. per sec. $8 \times 10^8$ cm./sec.
$t_2$ = period of time H$_2^+$ ions are in the plasma, $4 \times 10^{-6}$ sec.

The dissociation probability for H$_2^+$ ions calculates to be about .05.

Using this value of dissociation probability, $P = .05$, the trapping rate of energetic protons may be determined by the equation (7) $\qquad \dot{n}_p = \dfrac{IP}{v}$ where:

$\dot{n}_p$ = trapping rate in protons per cm.$^3$/sec.
$I$ = injection current in ions per sec., $2.5 \times 10^{18}$ ions/sec.
$v$ = plasma volume in cm.$^3$, $2.5 \times 10^5$ cm.$^3$
$P$ = probability for H$_2^+$ ion dissociation in the plasma = .05.

The resulting trapping rate, assuming the parameters stated, is of the order of $5 \times 10^{11}$ ions per cm.$^3$/sec.

The H$_2^+$ ions which pass through the plasma and fail to be ionized and which have a mass twice that of the dissociated proton describe an orbit 51 of twice the diameter of the proton orbit 52. The H$_2^+$ ion, therefore, returns to dissipate its energy by striking the molecular ion accelerating nozzle 53 being embedded therein or being neutralized to form gas and thus be excluded from the plasma in containment zone 40. The undissociated portion of the ion beam is removed by maintaining the background pressure at $10^{-8}$ mm. with the vacuum pump. At energetic proton densities of $10^{11}$ protons per cm.$^3$, the effective pumping speed of the plasma will be $5 \times 10^5$ liters per sec. This proton density will be attained in about 0.2 sec. or before an appreciable neutral density is established.

The plasma thus produced is composed almost entirely of protons and electrons with no introduced background contamination. Because there is a minimum of background contamination, charge exchange losses are reduced by several orders of magnitude, when compared with other plasma generating devices, without reducing the rate of dissociation of the injected ion beam. Thus energetic plasma build-up and reaction can occur shortly after the ions are injected.

While this example of my invention embodies specific configurations of magnetic mirror machines, ion injectors, gas purging equipment and He$^6$ generators, these devices are to be taken as only representative of the means of achieving their particular functions and is not intended to limit this invention except as defined in the following claims.

What is claimed is:

1. A process for obtaining a hot dense ion-electron plasma comprising the steps of creating a magnetic confining field in an evacuated chamber, introducing a radioisotope gas to provide relativistic electrons by radioactive decomposition simultaneously with injection of neutral gas molecules into said confining magnetic field thereby trapping said electrons in said confining magnetic field and ionizing said injected neutral gas molecules by interaction with said injected energetic electrons, introducing a second neutral gas into said field to replace said ionized neutral gas with ions of another element, compressing said confined plasma of energetic electrons and ions of another element, and then injecting energetic ions into said field to interact with said contained particle plasma to produce an energetic plasma of atomic ions and electrons.

2. A process for obtaining a hot dense ion-electron plasma according to claim 1 wherein the compressing of the plasma is simultaneous with the injecting of energetic ions into said field.

3. A process for obtaining a hot dense ion-electron plasma according to claim 1 wherein the evacuated chamber is maintained at a pressure below about $10^{-7}$ mm. of mercury.

4. A process for obtaining a hot dense ion-electron plasma comprising the steps of creating a magnetic confining field in an evacuated ihamber, introducing a radioisotope gas to provide relativistic electrons by radioactive decomposition simultaneously with injection of neutral gas molecules into said confining magnetic field thereby trapping said electrons in said confining magnetic field and ionizing said injected neutral gas molecules by interaction with said injected energetic electrons, introducing a second neutral gas into said field to replace said ionized neutral gas with ions of another element, compressing said confined plasma of energetic electrons and ions of another element, and then injecting energetic ions of hydrogen isotopes into said field to interact with said contained particle plasma to produce an energetic plasma of atomic ions and electrons.

5. A process for obtaining a hot dense ion-electron plasma comprising the steps of creating a magnetic confining field in an evacuated chamber, introducing $He^4$ and $He^6$ isotope gas molecules into said chamber, trapping electrons having relativistic velocities isotropically emitted upon the decay of said $He^6$ isotope and ionizing said $He^4$ isotope molecules by interaction with said emitted electrons and containing the resultant $(He^4)^+$ ions in said confining magnetic field, replacing said $(He^4)^+$ ions to provide an electron-proton plasma by introducing hydrogen gas into said chamber, compressing said plasma of energetic electrons and protons, and injecting energetic ions of hydrogen isotopes into said proton-electron plasma to produce a plasma of energetic hydrogen isotope ions and electrons.

6. A process for obtaining a hot dense ion-electron plasma according to claim 5 wherein the compressing of said confined plasma is simultaneous with the injecting of said energetic ions of hydrogen isotopes.

7. A process for obtaining a hot dense ion-electron plasma according to claim 5 wherein the evacuated chamber is maintained at a pressure below about $10^{-7}$ mm. Hg.

8. A process for obtaining a hot dense ion-electron plasma comprising the steps of creating a confining magnetic mirror field system defining a containment zone initial field strength of about 800 gauss in an evacuated chamber, injecting $He^6$ gas molecules into said chamber and trapping electrons having relativistic velocities isotropically emitted upon the decay of $He^6$ isotopes in said confining magnetic field, simultaneously injecting $He^4$ isotope gas with said $He^6$ isotope gas into said confining magnetic field to ionize said $He^4$ isotope gas by interaction with said emitted electrons and contain the $(He^4)^+$ ions in said confining magnetic field, replacing said $(He^4)^+$ ions with protons by passing hydrogen through the confining magnetic field thereby ionizing said hydrogen with said energetic electrons, compressing the resultant plasma of energetic particles by decreasing the effective containment zone length by a factor of at least one-third and by increasing the magnetic field to 10,000 gauss, and then injecting ions of hydrogen isotopes having an energy level of 600 kev. into the confined compressed proton-electron plasma to produce an energetic plasma of hydrogen isotope ions and electrons.

9. A process for obtaining a hot dense ion-electron plasma according to claim 8 wherein the compressing of said plasma is simultaneous with the injecting of said ions of hydrogen isotopes having an energy level of 600 kev.

10. A process for obtaining a hot dense ion-electron plasma according to claim 8 wherein the evacuated chamber is maintained at a pressure below about $10^{-7}$ mm. Hg.

11. Apparatus for obtaining a hot dense ion-electron plasma comprising, in combination, means defining a vacuum chamber including means for creating a centrally located magnetic confining field therein and means for controlling the intensity of said magnetic confining field, means for evacuating said vacuum chamber, means for generating electron emitting radioactive isotope and for introducing said isotope into said chamber, means for introducing a gas into said magnetic confining field in said chamber, and means for accelerating and injecting energetic particles into said magnetic confining field in said chamber.

12. Apparatus for obtaining a hot dense ion-electron plasma comprising, in combination, means defining a vacuum chamber including means for creating a centrally located magnetic confining field therein and means for controlling the intensity of said magnetic confining field, means for evacuating said vacuum chamber, means for generating electron emitting radioisotope gas and for introducing said isotope gas into said magnetic confining field in said chamber, means for introducing hydrogen gas into said magnetic confining field in said chamber, and means for accelerating and injecting energetic hydrogen isotope gas particles into said magnetic confining field in said chamber.

13. Apparatus for obtaining a hot dense ion-electron plasma comprising, in combination, means defining a vacuum chamber including means for creating a centrally located magnetic confining field therein and means for controlling intensity of said magnetic confining field, means for evacuating said vacuum chamber, means for generating the radioactive isotope of $He^6$ in admixture with $He^4$ gas and for introducing said isotope admixture of $He^6$ and $He^4$ into said magnetic confining field in said chamber, means for introducing hydrogen gas into said magnetic confining field in said chambers and means for accelerating and injecting energetic hydrogen isotope gas particles into said magnetic confining field in said chamber.

14. Apparatus for obtaining a hot dense ion-electron plasma comprising, in combination, means defining a vacuum chamber including means for creating and controlling the intensity and configuration of a centrally located magnetic confining field therein, means for evacuating said vacuum chamber, means for generating the radioactive isotope of $He^6$ in admixture with $He^4$ and for introducing said isotope admixture of $He^6$ and $He^4$ into said magnetic confining field in said chamber, means for introducing hydrogen gas into said magnetic confining field in said chamber, and means for accelerating and injecting energetic hydrogen isotope gas particles into said magnetic confining field in said chamber.

15. Apparatus for obtaining a hot dense ion-electron plasma comprising, in combination, means defining a vacuum chamber including means for creating and controlling the intensity and configuration of a centrally located magnetic confining field therein, means for evacuating said vacuum chamber in communication with one end thereof, means for generating the radioactive isotopes $He^6$ in admixture with $He^4$ including means for transporting said isotopes of $He^6$ and $He^4$ from their point of generation to a point of introduction at the second end of said vacuum chamber opposite said evacuating means, means for removing impurities from the flow of said isotope admixture of $He^6$ and $He^4$ prior to introduction into said vacuum chamber, means for introducing hydrogen gas into said magnetic confining field at the second end of said vacuum chamber opposite said evacuating means, and means for accelerating and injecting energetic hydrogen isotope gas particles into said magnetic confining field in said chamber.

16. Apparatus for obtaining a hot dense ion-electron plasma comprising, in combination, means defining a cylindrical vacuum chamber including means for creating and controlling the intensity and configuration of a centrally and axially located confining magnetic field coincident with respect to the axis of said vacuum chamber, means for evacuating said vacuum chamber in communication with one end and at a place coincident with the cylindrical axis thereof, means for generating an admixture of the radioactive isotope $He^6$ with $He^4$ including means for transporting said isotopes of $He^6$ and $He^4$ from their place of generation to their place of introduction at a point coincident with the axis of said magnetic field and said vacuum chamber and at the second end of the vacuum chamber opposite the means for evacuation of said vacuum chamber, means for controlling the flow of said $He^6$ and $He^4$, means for removing the impurities from the flow of said isotopes of $He^6$ and $He^4$ prior to introduction into said vacuum chamber, means for introducing hydrogen gas into said magnetic confining field at a point coincident with the means for introducing said isotopes of $He^6$ and $He^4$, means for controlling the flow of said hydrogen gas, and means for accelerating and injecting energetic hydrogen isotope gas particles into said magnetic confining field in said chamber.

No references cited.

REUBEN EPSTEIN, *Primary Examiner.*